May 12, 1936.  A. I. DUNN  2,040,601
CHUCK
Filed Feb. 1, 1935   3 Sheets-Sheet 1
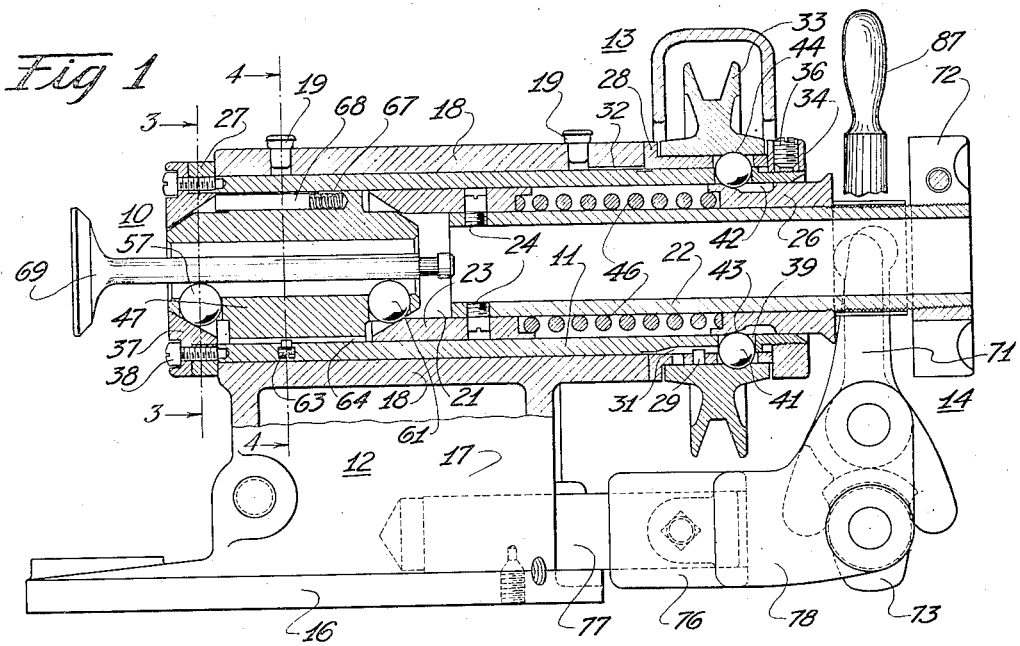
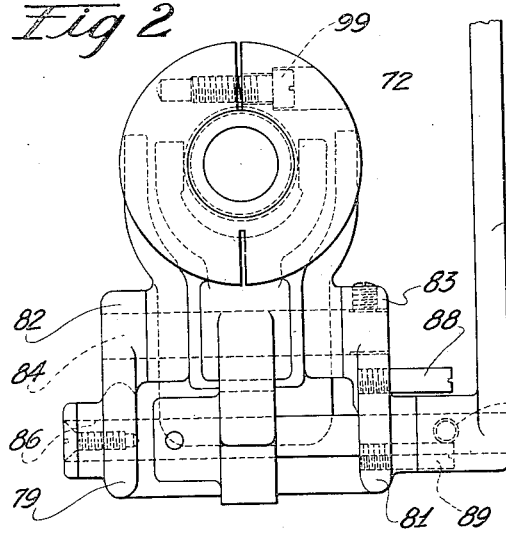
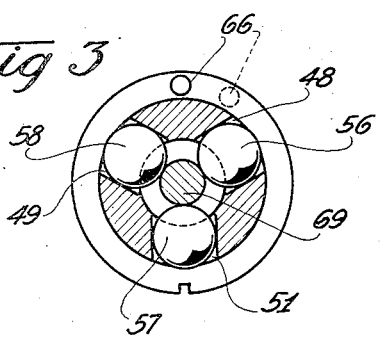
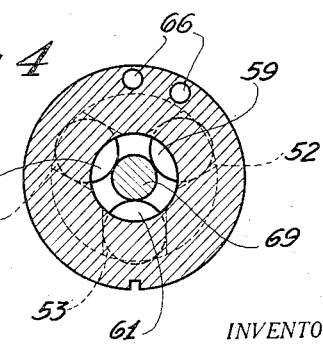
INVENTOR.
ALLEN I DUNN
BY Flournoy Corey
ATTORNEY.

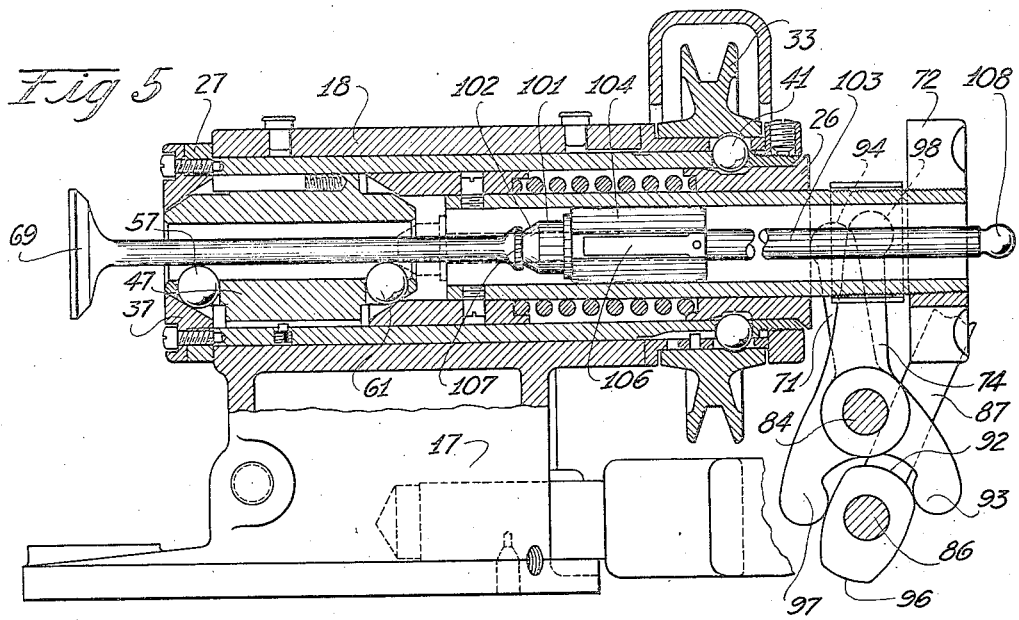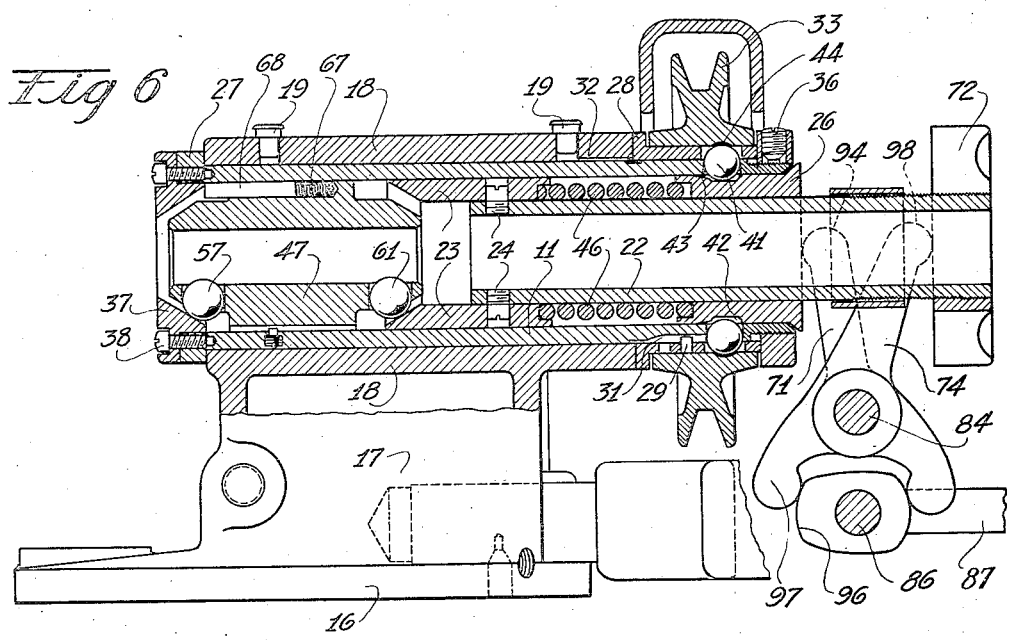

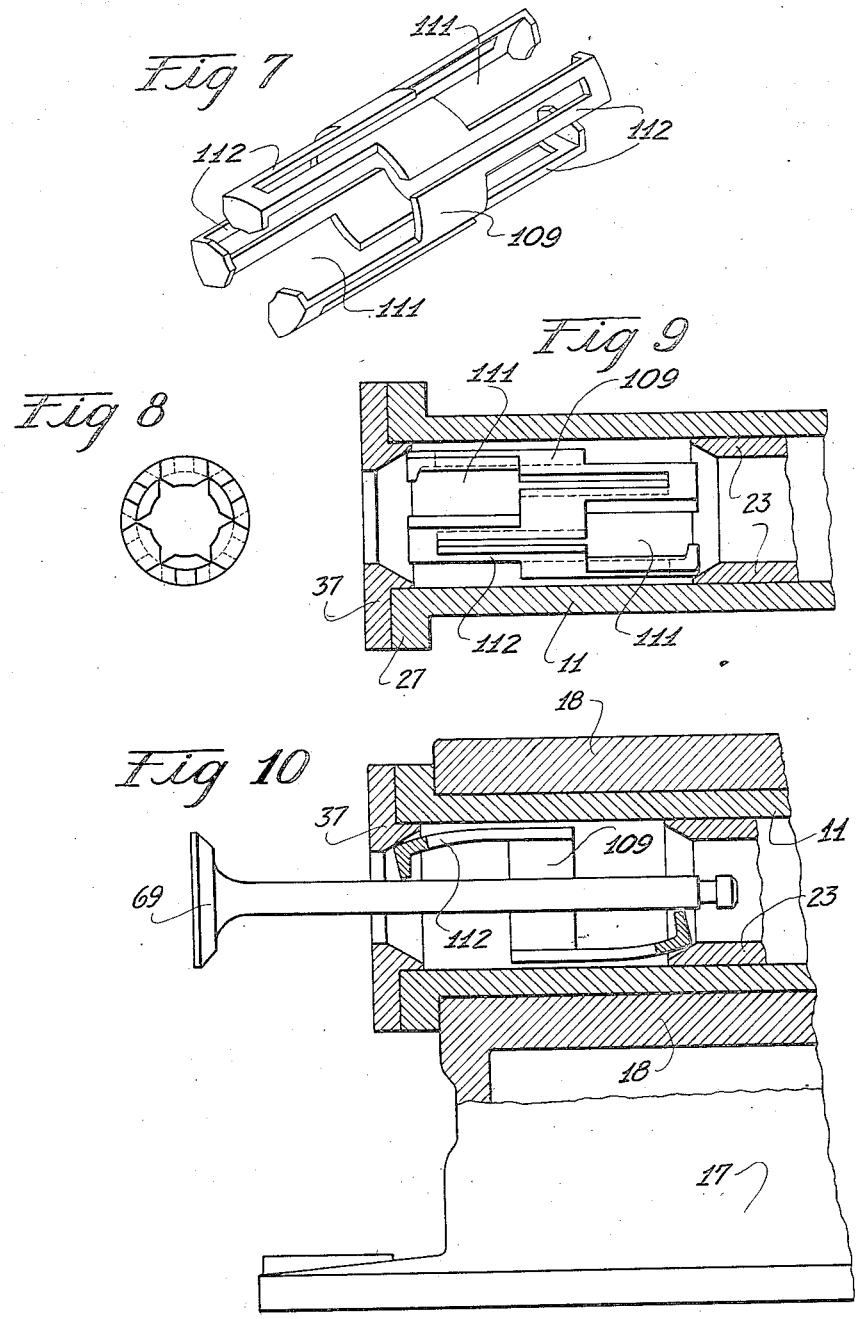

Patented May 12, 1936

2,040,601

UNITED STATES PATENT OFFICE 2,040,601

CHUCK

Allen I. Dunn, Cedar Rapids, Iowa, assignor to Cedar Rapids Engineering Company, Cedar Rapids, Iowa, a corporation of Iowa Application February 1, 1935, Serial No. 4,514

12 Claims. (Cl. 82—28)

This invention relates to chucks and has particular relation to chucks adapted for frictionally holding the work in positive axial alignment with and on a spindle and means for actuating the chucks.

While chucks constructed according to my invention may be utilized for holding a large variety of work, tools and the like, the embodiment here shown is particularly suitable for use in engaging rod-like members such as valve stems, and this embodiment of the invention is adapted for use with valve grinding machines.

I am aware that ball gripping devices have been utilized in other types of chucks and that longitudinally slidable elements have been utilized for wedging the balls into engagement with the work, but such devices have employed an internally threaded collar or the like for securing longitudinal movement of the wedges and wedging the balls. Such devices have the disadvantage that the locking collars must be manually rotated to secure engagement and disengagement of the chucks which took up considerable time in placing and removing the work. This disadvantage becomes particularly apparent in chucking a valve having a mushroom end such as the Ford valve. In chucking this valve with the usual chuck the locking collar must be rotated through many turns in each direction to permit the mushroom end to enter the chuck, to engage the chuck, then disengage the chuck and permit the head to be withdrawn from the chuck.

It is therefore a general object of my invention to provide a chuck in which a single lever means may be employed to quickly engage and disengage the work and quickly engage and disengage the driving pulley to the chuck spindle.

Another general object of the invention is to provide an improved type of readily adjustable chuck for frictionally holding the work in positive axial alignment with and on a spindle.

Another object of my invention is to provide a chuck which will quickly and readily engage and disengage a mushroom ended valve stem such as the present Ford valve.

An object of my invention is to provide control means for controlling engagement and disengagement of the chuck and engagement and disengagement of the driving means.

Another object of my invention is to provide a chuck which grips the work without the use of threaded locking means or the like.

Another object of my invention is to provide a chuck in which resilient means are employed for locking the chuck to engage the work.

Another object of my invention is to provide a chuck having resilient means for locking the chuck to engage the work and control means for withdrawing the resilient means in order to free the work.

Another object of my invention is to provide a chuck having resilient means for causing the chuck to engage the work and means whereby the same resilient means may be employed for engaging the driving means to the chuck.

Another object of my invention is to provide, in a chuck of the above character, control means which will permit the operator to selectively actuate the chuck to engage and disengage the work and to engage or disengage the driving means with the chuck spindle.

A feature of the invention is the application of a spring for holding the chuck in work engaging position and also for engaging and disengaging the chuck spindle driving means.

Another feature of the invention is that the normal or disengaged position of the control means is the operative or engaged position of the chuck and chuck clutch.

Other and further features and objects of my invention will be more apparent to those skilled in the art upon a consideration of the accompanying drawings and following specification, wherein is disclosed an exemplary embodiment of the invention, with the understanding, however, that such changes may be made therein as fall within the scope of the appended claims without departing from the spirit of the invention. The device may be used or adapted for use for other purposes.

In the accompanying drawings I have shown a preferred form of my invention in which Figure 1 is a view, partly in section and partly in elevation, of the chuck, chuck spindle, chuck spindle pedestal, the spindle rotating means, and the control means of a device constructed according to one embodiment of my invention. In the view here shown the work is engaged by the chuck and the driving clutch is engaged to drive the chuck spindle.

Figure 2 is an end view of the device shown in Figure 1.

Figure 3 is a view in section of the chuck ball retainer taken along the line 3—3 of Figure 1.

Figure 4 is a view in section of the chuck ball retainer taken along the line 4—4 of Figure 1.

Figure 5 is a view, partly in section and partly in elevation, of the device shown in Figure 1 as it appears with the control means positioned to cause the driving means to be disengaged from the chuck spindle while the chuck still engages the work. Figure 5 also shows a valve stop which I may use if desired.

Figure 6 is a view, partly in section and partly in elevation, of the device shown in Figure 1 as is appears when the driving means is disengaged from the chuck spindle and the chuck is disengaged from the work.

Figure 7 is a view in perspective of a modified form of chuck head which may be employed in a chuck constructed according to another embodiment of my invention.

Figure 8 is an end view of the device shown in Figure 7.

Figure 9 is a view, partly in section and partly in elevation, illustrating how the chuck head shown in Figure 7 is engaged in a spindle constructed according to another embodiment of my invention, and with the chuck head as its appears in disengaged position; and Figure 10 is a view, partly in section and partly in elevation, illustrating how the chuck head shown in Figure 7 appears in place in a spindle and pedestal constructed according to my invention. The chuck head is in work engaging position.

A chuck constructed according to one embodiment of my invention is comprised of a chuck head indicated generally at 10, a chuck spindle indicated at 11, a pedestal 12 in which the chuck and chuck spindle are rotatably mounted, a driving clutch 13 and a control mechanism 14.

The pedestal 12 preferably has a flat broad lower face 16 in order that it may be pivotally mounted upon the flat upper surface of a grinder bed (not shown) in accordance with the usual practice. The main body portion 17 of the pedestal 12 is substantially rectangular in cross section as indicated in the drawings, and the upper portion 18 is formed in a long cylinder adapted to form a bearing for the spindle 11. Lubricant may be introduced into the spindle bearing 18 through the oil-cups 19 located at the top of the bearing.

The spindle 11 is a long cylindrical quill-like member in which the central opening 21 is absolutely concentric with the outer surface of the spindle. Another quill-like member 22 of about the same length as member 11 is adapted to telescope within the member 11, and this latter member 22 may be termed the control sleeve. An internally tapered collar 23, which may be termed the "floating wedge" of the chuck head 10, is engaged on the inner end of the control sleeve 22, as by means of set screws 24 and, of course, the floating wedge 23 is longitudinally slidable within the spindle 11. A clutch collar 26 is mounted on the control sleeve 22 for slidable longitudinal movement therewith and is also slidable within the innermost end of the spindle 11.

The spindle 11 is, of course, rotatable within the head 18. Endwise shifting movement of the spindle within the head is prevented by shoulder 27 formed on the spindle 11 at the chuck end thereof, and a radially extending flanged portion of pulley sleeve 28 at the clutch end of the spindle. The pulley sleeve 28 is keyed to the spindle as by means of a pin 29 and keyway 31. An opening 32 to the pulley sleeve permits oil to flow from the outer face of the spindle to the pulley 33 which is mounted for rotation on the pulley sleeve 28. The pulley sleeve is backed up by an internally threaded adjustable nut 34 which is threaded on the extreme clutch end of the spindle 11 and which may be locked in proper position by means of a set screw 36. By providing the threaded nut 34 for backing the pulley sleeve 28, a "take up" adjustment is provided which may be adjusted at any time to compensate for wear.

An internally beveled collar 37, which may be termed the "fixed wedge" or "spindle wedge", although it rotates with the spindle, is secured on the end of the spindle 11 as by means of cap screws 38.

The spindle 11 and collar 26 have a number of spaced radial openings 39 therethrough and balls 41 are located in these openings. The clutch collar 26 is provided with a peripheral groove 42 having one side wall thereof tapered, as indicated at 43, to form a cone wedge for receiving the balls 41 and for forcing them outwardly against the inner face of the pulley 33 on longitudinal movement of the clutch collar 26. The inner face of the pulley 33 is preferably provided with a groove, indicated at 44, adapted to partially receive these balls 41.

It is apparent that if the clutch collar 26 is moved outwardly to a position such that the balls 41 are wedged into frictional engagement with the pulley 33 and the pulley 33 is rotated, the clutch collar 26, the control sleeve 22, and the spindle 11 carrying the entire chuck assembly will be rotated. This position of the clutch collar and other parts is indicated in Figure 1, and it is further apparent that the compression spring 46 will normally urge the clutch collar 26 outwardly so that the drive pulley is engaged to the spindle. If the clutch collar 26 is forced inwardly the balls 41 will drop into the groove 42, the pulley may then rotate freely on the pulley sleeve 28, and the spindle itself will come to rest. This disposition and position of the parts is shown in Figures 5 and 6.

The chuck head 10 includes the barrel-like chuck ball retainer or spacer 47. The ends of the spacer 47 are bevelled for clearance at the "fixed wedge" 37 and the floating wedge 23. These bevelled ends are each provided with three equally spaced radial openings 48, 49, 51, 52, 53 and 54, shown in Figures 3 and 4 of the drawings, having balls 56, 57, 58, 59, 61 and 62 therein. The ball retainer 47 is keyed to the spindle by means of set screw 63 and keyway 64. As a means for centering the chuck ball retainer between the fixed wedge 37 and the floating wedge 23 two openings 66 are provided which are drilled longitudinally near the outer periphery of the spacer 47 from opposite ends thereof, and a pair of springs 67 and pins 68 are located within the openings 66. The springs push the pins outwardly to bear against the ends of the fixed and floating wedges and thus when the floating wedge 23 is moved to the right by the control sleeve 22 the chuck ball retainer will take up a position equally spaced from the fixed and floating wedges to free both sets of chuck balls.

It is apparent that if the floating wedge 23 is moved to the left, as by the spring 46, the balls 59, 61 and 62 will be driven inwardly radially and any object such as the valve stem 69 will be engaged by the said balls and further movement of the wedge 23 will force the spacer 47 to the left to cause the balls 56, 57 and 58 to engage the stem. The pressure of the spring causes these balls to be driven inwardly with sufficient force to tightly engage the work, such as stem 69, in exact concentric relation in and to the spindle 11.

The compression spring 46 normally urges the floating wedge 47 to the left to cause the chuck to normally engage any object placed within the chuck, but it is apparent that, if the control sleeve 22 is moved to the right, as for instance by the yoke 74 bearing against the inner face of the control sleeve nut 72, the wedge 47 will be moved to the right against the compression of the spring, and the wedging action against the chuck balls removed to permit the balls to move radially outwardly and disengage the work 69.

I have arranged the parts so far described in such a manner that control of the movement of these parts may be effected by means located at the opposite end of the spindle from the work. These control means include a master cam 73 and yoke follower arms 71 and 74, which parts are mounted for pivotal movement on a control mounting bracket 76. The support arm 76 includes a rod 77 which is received in the base of the pedestal 12 and a bifurcated portion 78 which is secured over the outer end of the rod 77. The arms 79 and 81 of the bifurcated portion 78 are indicated in Figure 2. Each of the arms 79 and 81 have upwardly extending portions 82 and 83 respectively, and the two yokes are pivotally mounted upon a pin 84 which is mounted in the upwardly extending portions 82 and 83. Another pin or shaft 86 is mounted in the arms 79 and 81 below the shaft or pin 84 and a master cam 73 is mounted on the shaft 86. A control lever 87 is mounted on the outer end of the shaft 86 and is adapted to rotate the shaft between limits fixed by the pins 88 and 89 located on the arm 81 and the pin 91 on the control lever 87.

The cam 73 is provided with an upper lobe 92 such that, on rotation of the lever 87 to an intermediate position, shown in Figure 5, the lobe 92 engages the follower portion 93 of the chuck yoke 71 and causes the upper or clutch collar engaging end 94 to be moved to the left to disengage the clutch in the manner previously outlined.

If the lever arm 87 is rotated still further to an extreme position, as indicated in Figure 6, a lower cam lobe 96 will engage the cam follower 97 of yoke 74 and cause the upper or clutch control engaging portion 98 to move to the right or outwardly to engage the split nut 72 to disengage the chuck from the work in accordance with the action previously described. The round nut is split in order that it may be rotated to any desired position on the threaded portion of sleeve 22 and then locked in place by the cap screw 99. The position of the split nut 72 on the sleeve 22 determines the movement of the wedge 23 and thus a change in position of the nut changes the capacity of the chuck the range of movement of the yoke 71 is limited but the further the floating wedge 23 moves to the right the greater the capacity of the chuck, within limits of course.

It is now apparent that when the lever arm 87 is in upright position, such as indicated in Figures 1 and 2, the clutch is engaged to the chuck spindle and the work is engaged by the chuck. If the lever arm is moved to an intermediate position, such as shown in Figure 5, the clutch is disengaged but the work is still engaged by the chuck. If the lever arm is then moved to its extreme operative position (Figure 6) the clutch is maintained in disengaged position and the wedges of the chuck are withdrawn to permit withdrawal of the work.

It may sometimes be difficult to engage work of large diameter in the chuck because the inner end of the work is of such large diameter that it does not readily spread the chuck balls apart. I may employ any one or more of several expedients to engage or disengage work pieces of this character. One of the devices which I may utilize is a combined stop and spreading instrument such as the plunger 101 shown in Figure 5. This plunger 101 is provided with a tapered end, indicated at 102, and the stem 103 of the plunger is slidably engaged within a collar 104 to permit longitudinal movement of the plunger. A spring 106 is utilized to hold the collar 104 in position within the control shaft 22. Ordinarily the inner face 107 of the plunger acts as a stop to determine the position of the work when it is inserted in the drive shaft. The outer end 108 of the plunger 101 projects beyond the outer face of the nut 72 and thus permits manually pressing the plunger inwardly. When the plunger is pressed inwardly to the position indicated in dotted lines in Figure 5, the tapered inner end thereof will spreads the balls in the chuck retainer 47.

A chuck constructed according to my invention may readily be used or adapted for use with other types of chuck heads. In Figures 7 to 10 inclusive I have illustrated how a one piece spring chuck head 109 may be used with my chuck. The chuck head 109 was initially a thin-walled cylinder having inturned flanges at either end thereof. The cylinder has been milled out alternately from one end and then the other, as indicated at 111, so that only a plurality of narrow fingers 112 remain. The milled recesses 111 extend on into the fingers 112.

The chuck head 109 is constructed of a flexible and resilient material, such as spring steel and, inasmuch as it is greatly weakened by the recesses 111, the fingers 112 may readily be driven inwardly to engage the work as shown in Figure 10. This structure lends itself admirably for use in a chuck constructed according to my invention. The fixed wedge 37 and floating wedge 23 readily engage the ends of the fingers 112 and drive them inwardly to engage the work in response to the forcing action of spring 46 and will disengage the work and assume a spaced relation in the spindle, as illustrated in Figure 9, when the pressure of the spring 46 is removed.

It is apparent that, with a device constructed according to my invention, it is not necessary to rotate some threaded member to secure locking of the device, and that locking or chucking of the work may be accomplished by the movement of a single lever. It is furthermore apparent that a single movement of the lever will cause the clutch to be engaged to rotate the spindle. Rotation of the lever in the opposite direction will first disengage the clutch to permit the spindle to stop, and continued rotation of the lever will free the work in order that it may be withdrawn from the machine. A single spring holds all the parts in operative position.

It is apparent that modifications may be made by those skilled in the art. Such modifications may be made without departing from the spirit and scope of my invention as set forth in the appended claims.

I claim as my invention:

1. In a chuck, a pedestal, a spindle rotatably mounted in the pedestal, a wedge on the end of the spindle, a floating wedge within the spindle, chuck balls adapted to be moved radially by the wedges for engaging the work, a control shaft within the spindle engaged to the wedge within the spindle, a clutch collar mounted on the control shaft, a drive pulley rotatably mounted on the spindle, clutch balls in the spindle beneath the drive pulley and the clutch collar having a wedge portion adapted to force the clutch balls outwardly to engage the drive pulley, a spring adapted to urge the floating wedge and clutch collar apart to cause the chuck balls to engage the work and the clutch balls to engage the pulley, and the control shaft being attached to the floating wedge and slidable within the clutch collar for withdrawing the floating wedge.

2. In a chuck, a pedestal, a spindle rotatably mounted in the pedestal, a wedge on the end of the spindle, another longitudinally movable floating wedge within the spindle, balls adapted to be moved radially by the wedges for engaging the work, a control shaft within the spindle engaged to the wedge within the spindle, a clutch collar mounted on the control shaft, a drive pulley rotatably mounted on the spindle, and the clutch collar having a wedge portion adapted to force the ball members outwardly to engage the drive pulley, a spring adapted to urge the wedge and clutch collar apart to cause the work engaging balls to engage the work and to cause the clutch collar to drive the clutch balls outwardly to engage the pulley, the control shaft being attached to the wedge and slidable within the clutch collar for withdrawing the floating wedge, and means for driving the clutch collar inwardly to disengage the clutch and other means for driving the outer end of the control shaft outwardly to disengage the chuck from the work.

3. In a chuck structure, a spindle, a chuck within the spindle, an axially movable wedge for operating the chuck, a pulley rotatably mounted on the spindle, a wedge means for engaging the pulley to the spindle, and an axially located spring for causing the wedges to engage the chuck and pulley respectively.

4. In a chuck structure, a spindle, a chuck in one portion of the spindle, radially movable means in the chuck for engaging the work, wedge means for actuating the radially movable means, a pulley rotatably mounted on the spindle, radially movable means for engaging the pulley and a wedge for operating the radially movable means for engaging the pulley and spring means for urging the wedge means apart to cause the chuck to engage the work and the pulley to engage the spindle.

5. In a chuck structure, a spindle, a chuck and wedge for operating the chuck to engage the work, the wedge and chuck being located within the spindle and a second wedge means also within the spindle, a pulley rotatably mounted on the spindle and a radially movable means operated by the second wedge for engaging the pulley to the spindle.

6. In a chuck structure, a spindle, a chuck within the spindle, an axially movable wedge for operating the chuck including a quill member for moving the wedge back and forth, the said quill member projecting beyond the end of the spindle, a pulley rotatably mounted on the spindle, a wedge member on the quill member for causing the pulley to engage the spindle also projecting beyond the end of the spindle, and follower means for pressing the last named wedge inwardly and pulling the quill member outwardly for respectively disengaging the pulley and chuck.

7. In a chuck structure, a spindle, a chuck, wedge means for actuating the chuck, a pulley and means for engaging the pulley to the spindle including a wedge means, and means for moving the first named wedge including a follower means, and a second follower means for actuating the second named wedge.

8. In a chuck structure, a chuck including wedge means for operating the chuck and a member operatively engaged to the wedge means for moving it, a follower for moving the last named member, a drive means for the spindle including a clutch member, a follower for actuating the clutch member and a cam member for operating the follower member.

9. In a chuck structure, a spindle, a chuck in one portion of the spindle, radially movable means in the chuck for engaging the work, a control sleeve in another portion of the spindle, axially movable wedge means mounted in the control sleeve for actuating the radially movable work engaging means in the chuck, a drive pulley mounted on the spindle, an axially movable clutch collar having a wedge portion mounted on the control sleeve, radially movable pulley engaging means mounted on the clutch collar adapted to be actuated by the wedge portion in the clutch collar, a spring means mounted on the control sleeve adapted to urge apart the wedge means operating the work engaging means and the clutch collar to cause the work engaging means to engage the work and the pulley engaging means to engage the pulley, and control means adapted to operate the control sleeve.

10. In a chuck structure, a spindle, a chuck in one portion of the spindle having work engaging means, a control sleeve in another portion of the spindle, wedge means cooperatively engaged to the control sleeve for actuating the chuck work engaging means, a drive pulley, a clutch means mounted on the control sleeve for engaging the drive pulley, spring means on the control sleeve for actuating the chuck actuating means and the clutch means, means mounted within the control sleeve to spread the work engaging means of the chuck and to serve as a stop for the work, follower means for drawing the control sleeve outwardly to operate the wedge means actuating the work engaging means and other follower means for disengaging the clutch means.

11. In a chuck structure, a work engaging means, a clutch, spring means for normally biasing both the work engaging means and the clutch into engagement whereby the work is engaged while the chuck is rotating, and cam and follower means for first disengaging the clutch to stop the chuck from rotating and on continued operation of the cam, then disengaging the work engaging means.

12. In a chuck structure, a work engaging means adapted to be engaged by spring pressure and a clutch also adapted to be engaged by spring pressure, a spring for applying pressure to the work engaging means and the clutch, the work engaging means and clutch each having means against which the spring presses to engage them, and means for withdrawing the spring pressed means to disengage the work engaging means and the clutch, the last named means including a cam and follower mechanism.

ALLEN I. DUNN.